United States Patent
Haine et al.

(10) Patent No.: US 10,797,850 B2
(45) Date of Patent: Oct. 6, 2020

(54) TRANSCEIVER APPARATUS SUPPORTING ANTENNA SELECTION AND METHOD OF PROCESSING RECEIVED SIGNALS

(71) Applicant: u-blox AG, Thalwil (CH)

(72) Inventors: John Haine, Cambridge (GB); Peter Mutitika Kibutu, Cambridge (GB)

(73) Assignee: u-blox AG, Thalwil (CH)

( * ) Notice: Subject to any disclaimer, the term of this patent is extended or adjusted under 35 U.S.C. 154(b) by 2 days.

(21) Appl. No.: 15/780,263

(22) PCT Filed: Dec. 16, 2015

(86) PCT No.: PCT/EP2015/080115
§ 371 (c)(1),
(2) Date: May 31, 2018

(87) PCT Pub. No.: WO2017/102002
PCT Pub. Date: Jun. 22, 2017

(65) Prior Publication Data
US 2018/0359077 A1    Dec. 13, 2018

(51) Int. Cl.
  H04L 5/14      (2006.01)
  H04B 7/06      (2006.01)
  (Continued)

(52) U.S. Cl.
  CPC ......... H04L 5/1461 (2013.01); H04B 7/0404 (2013.01); H04B 7/0413 (2013.01);
  (Continued)

(58) Field of Classification Search
  CPC ............. H04L 5/1461; H04L 25/03057; H04L 2025/03426; H04B 7/0404; H04B 7/0413;
  (Continued)

(56) References Cited

U.S. PATENT DOCUMENTS

2004/0259511 A1    12/2004  Liu et al.
2010/0022192 A1*   1/2010   Knudsen .............. H04B 7/0608
                                                          455/70
(Continued)

FOREIGN PATENT DOCUMENTS

JP        2007311994 A     11/2007

OTHER PUBLICATIONS

International Search Report PCT/ISA/210 for International Application No. PCT/EP2015/080115 dated Sep. 30, 2016.
(Continued)

Primary Examiner — Steven H Nguyen
(74) Attorney, Agent, or Firm — Finnegan, Henderson, Farabow, Garrett & Dunner LLP

(57) ABSTRACT

A transceiver apparatus (204) is configured to support antenna selection in accordance with a communications standard. The apparatus comprises a hardware subsystem (300) comprising a duplexing component (328), a transmitter chain, a first receiver chain (308) and a second receiver chain (310) respectively comprising a first antenna port (336) and a second antenna port (342) at an upstream end thereof. The first receiver chain (308) and the transmitter chain sharing the duplexing component (328). The apparatus further comprises a signal redirection system (330, 350, 372) arranged to couple temporarily the second antenna port (342) to the first receiver chain (308) at a point of entry thereof and in response to an antenna selection instruction, thereby redirecting temporarily a signal path from the second antenna port (342) into the first receiver chain (308) and then back into the second receiver chain (310) downstream of the point of entry.

19 Claims, 6 Drawing Sheets

(51) Int. Cl.
H04B 7/08 (2006.01)
H04B 7/0404 (2017.01)
H04B 7/0413 (2017.01)
H04L 25/03 (2006.01)

(52) U.S. Cl.
CPC ......... H04B 7/0602 (2013.01); H04B 7/0817 (2013.01); H04L 25/03057 (2013.01); H04B 7/0608 (2013.01); H04L 2025/03426 (2013.01)

(58) Field of Classification Search
CPC ... H04B 7/0817; H04B 7/0602; H04B 7/0608
See application file for complete search history.

(56) References Cited

U.S. PATENT DOCUMENTS

| | | | |
|---|---|---|---|
| 2011/0136446 A1* | 6/2011 | Komninakis | H04B 7/0691 455/78 |
| 2012/0112970 A1 | 5/2012 | Caballero et al. | |
| 2013/0203370 A1 | 8/2013 | Hsin et al. | |
| 2013/0322562 A1* | 12/2013 | Zhang | H04B 7/0404 375/267 |
| 2015/0065073 A1* | 3/2015 | Yan | H04B 7/0868 455/133 |

OTHER PUBLICATIONS

Written Opinion of the International Searching Authority PCT/ISA/237 for International Application No. PCT/EP2015/080115 dated Sep. 30, 2016.

\* cited by examiner

TRANSCEIVER APPARATUS SUPPORTING ANTENNA SELECTION AND METHOD OF PROCESSING RECEIVED SIGNALS

FIELD OF THE INVENTION

The present invention relates to a transceiver apparatus of the type that, for example, comprises a first antenna port and a second antenna port for antenna diversity. The present invention also relates to a method of processing received signals, the method being of the type that, for example, receives signals at a first antenna and a second antenna.

BACKGROUND OF THE INVENTION

Communications systems that are reliant upon Orthogonal Frequency Division Multiplexing schemes, for example Long Term Evolution (LTE) communications systems, which are sometimes referred to as 4G communications systems, are known to employ base stations, sometimes referred to as evolved Node Bs (eNodeBs) capable of communicating with User Equipment (UE) units. The UE units are typically used by subscribers to one or more cellular communications services provided by a network infrastructure that comprises a plurality of the eNodeBs to support a respective plurality of notional cells that provide wireless communications coverage for the UEs over a geographic region. The eNodeBs and the UE units are examples of communications equipment that comprise modems.

In the UE unit, a baseband IC and a Radio Frequency (RF) IC together typically support a transceiver architecture having a transmitter chain and a receiver chain that support operation in accordance with the different variants of the Orthogonal Frequency Division Multiplexing (OFDM) communications scheme used respectively for uplink and downlink communications. However, RF and baseband processing can be supported by a single IC. For the LTE communications system, the OFDM scheme is used in conjunction with a Frequency Division Duplexing (FDD) system, where transmission and reception takes place simultaneously albeit in different frequency bands, for example a system transmission band and a system reception band.

In this type of system, Antenna Selection (AS) is a practice that exploits spatial diversity benefits that accompany the use of multiple antennas. One type of AS is Transmit AS (TAS), for example as set out in TS36.123, v8.08, Section 8.7 of the LTE standard, where an antenna of the UE unit can be selected from a pair of antennas of the UE unit. According to the LTE standard, support for this feature is optional. When supported, though, it is known for a given UE unit to comprise multiple antennas. Due to cost constraints, the number of antennas is typically two or four. For example, the UE unit can comprise a first antenna and a second antenna respectively coupled to a first transceiver chain and a second transceiver chain via a first duplexer and a second duplexer. Each transceiver chain respectively comprises a transmitter chain and a receiver chain. The objective of the TAS feature is to ensure that the UE unit uses the best antenna for uplink communications.

In this regard, when the TAS feature is supported by the network, the eNodeB make use of sounding signals, one such signal being a so-called Sounding Reference Signal (SRS). The eNodeB uses the received SRSs to measure the quality of the uplink channel, H, between the each of the antennas of the UE unit and each of the antennas of the eNodeB. In this respect, the channel quality, H, is determined in respect of all uplink antenna combinations. The quality of the uplink channel is used to identify a subset of antennas that provide the best uplink channel quality. In this example, the eNodeB selects one of the two antennas possessed by the UE unit based upon an assessment of the quality of the uplink channel, H. After identifying the antenna associated with the best uplink channel quality, the eNodeB then uses the so-called Physical Uplink Shared CHannel (PUSCH) to instruct the UE unit as to which antenna to use for communications by coding such information in an uplink grant control message.

However, for TAS to be implemented, both antennas of the UE unit need respective transceiver chains to enable simultaneous operation with the transmitter when the antenna is selected. This leads to considerable complexity, because duplexers are narrow-band components and the power amplifier of each transmitter chain of each transceiver chain needs to be switched to a correspondingly appropriate duplexer.

As such, the requirement for a set of duplexers, one set for each transceiver chain, represents a manufacturing expense that would benefit from being reduced. In this respect, in Release 8 of the LTE standard, the UE unit comprises multiple receive antennas, but only one transmit antenna, because only one transmitter chain (comprising one power amplifier) is employed in order to minimise cost and simplify hardware design. As such, in this reduced cost implementation the UE unit comprises, for example, two antennas, one transmitter chain and two received chains, one of the receiver chains and the transmitter chain are coupled to one of the antennas via a duplexer and the other receiver chain is coupled to the other antenna.

However, when considering ways of reducing the cost and complexity of the transceiver to support TAS, it must be remembered that the UE unit possesses multiple antennas not just for TAS, for example to support receive Multiple Input Multiple Output (MIMO) channels. Consequently, any modification to the configuration of the modem needs to ensure that the modem is not brought into non-conformity with certain assumptions used to optimise for multipath characteristics in respect of the channel equalisation algorithm used by the receiver chain of the UE unit and the transmitter chain of the eNodeB. In this respect, the channel equalisation algorithm employed assumes that channel characteristics between the two antenna ports of the UE unit are largely uncorrelated and independent.

BRIEF SUMMARY OF THE INVENTION

According to a first aspect of the present invention, there is provided a transceiver apparatus configured to support antenna selection in accordance with a communications standard, the apparatus comprising: a hardware subsystem comprising: a duplexing component; a transmitter chain; a first receiver chain and a second receiver chain respectively comprising a first antenna port and a second antenna port at an upstream end thereof, the first receiver chain and the transmitter chain sharing the duplexing component; and a signal redirection system arranged to couple temporarily the second antenna port to the first receiver chain at a point of entry thereof and in response to an antenna selection instruction, thereby redirecting temporarily a signal path from the second antenna port into the first receiver chain and then back into the second receiver chain downstream of the point of entry.

The transmitter chain may be a sole transmitter chain.

A portion of the first receiver chain may comprise receive path amplification and a portion of the second receiver chain may also comprise the receive path amplification.

The signal redirection system may be arranged to control coupling between the receive path amplification and the first and second antenna ports.

The first receiver chain may comprise a first downstream processing portion and the second receiver chain may comprise a second downstream processing portion.

The signal redirection system may be arranged to control coupling between the receive path amplification and the first and second downstream processing portions.

The signal redirection system may be arranged to maintain a predetermined processing relationship between the first and second downstream processing portions and the first and second antenna ports.

The duplexing component may comprise an antenna-side port, a transmit-side port and a receive-side port; the receive-side port may be operably coupled to the receive path amplification in respect of the first receiver chain.

The signal redirection system may comprise an antenna switch operably coupled to the first and second antenna ports and the receive path amplification.

The antenna switch may be operably coupled to the receive path amplification in respect of the first receiver chain via the duplexing component.

The transmitter chain may comprise transmit path amplification and the antenna switch may be coupled to the transmit path amplification via the duplexing component.

The transmit path amplification may comprise a power amplifier. An output of the power amplifier may be operably coupled to a transmit-side port of the duplexing component.

The receive path amplification may comprise: a first low-noise amplifier in respect of the first receiver chain and a second low-noise amplifier in respect of the second receiver chain.

An output of the first low-noise amplifier may be operably coupled to a receive-side port of the duplexing component.

An output of the second low-noise amplifier may be operably coupled to the antenna switch.

The signal redirection system may comprise a signal path reinstatement component; the first and second downstream processing portions may comprise the signal path reinstatement component.

The signal path reinstatement component may be arranged to return the signal path redirected into the first receiver chain and originating from the second antenna port back to the second downstream portion of the second receiver chain, thereby maintaining the predetermined processing relationship between the second downstream processing portion and the second antenna port.

The returning of the signal path back to the second downstream processing portion may complete the temporary redirection of the signal path originating from the second antenna port.

The apparatus may further comprise a controller arranged to coordinate the temporary redirection of the signal path from the second antenna port into the first receiver chain.

The controller may be arranged to control coordination of the temporary redirection temporally.

The first downstream processing portion and the second downstream processing portion respectively may comprise a first algorithmic data processing path and a second algorithmic data processing path, and the signal path reinstatement component may be arranged to ensure sample data in respect of the second antenna port may be processed by the second algorithmic data processing path.

The sample data may be stored in a memory in respect of the first algorithmic data processing path, and the signal path reinstatement component may be arranged to modify access to the sample data so that the sample data may be processed by the second algorithmic data processing path instead of the first algorithmic data processing path.

The controller may be arranged to receive a transmit antenna selection instruction and to coordinate the temporary redirection of the signal path in response to the received instruction.

The controller may be arranged to instruct the antenna switch to toggle coupling of the transmitter chain between the first and second antenna ports.

The first receiver chain may comprise a first analogue-to-digital converter having a first maximum signal headroom threshold requirement associated therewith, and the controller may be arranged to determine whether application of the receive path amplification in respect of the first receiver chain to a first signal received via the second antenna port results in the first maximum signal headroom threshold requirement being exceeded.

The second receiver chain may comprise a second analogue-to-digital converter having a second maximum signal headroom threshold requirement associated therewith, and the controller may be arranged to determine whether application of the receive path amplification in respect of the second receiver chain to a second signal received via the first antenna port results in the second maximum signal headroom threshold requirement being exceeded.

The controller may be arranged to re-programme a first gain in respect of the first receiver chain and a second gain in respect of the second receiver chain in response to the first and second minimum signal headroom threshold requirements being satisfied in respect of amplification of both first and second signals received via the first and second antenna ports, respectively.

The controller may be arranged to apply a gain modification in respect of baseband processing of symbols associated with the first and second received signals.

The signal redirection system may be arranged to redirect temporarily the signal path from the second antenna port into the first receiver chain in response to an instruction to switch from using the first antenna port instead of the second antenna port in respect of uplink transmissions.

The transmitter chain may be persistently coupled to the first antenna port instead of the second antenna port in response to the instruction until a countermanding instruction is received.

According to a second aspect of the present invention, there is provided a user equipment transceiver apparatus comprising the apparatus as set forth above in relation to the first aspect of the invention.

According to a third aspect of the present invention, there is provided a modem comprising the transceiver apparatus as set forth above in relation to the second aspect of the invention.

According to a fourth aspect of the present invention, there is provided a user equipment communications apparatus comprising the transceiver apparatus as set forth above in relation to the second aspect of the invention.

According to a fifth aspect of the present invention, there is provided a method of processing received signals in a transceiver apparatus comprising a transmitter chain, a first receiver chain and a second receiver chain respectively comprising a first antenna port and a second antenna port at an upstream end thereof and the first receiver chain and the transmitter chain sharing a duplexing component, the method comprising: receiving an instruction to switch from using the first antenna port instead of the second antenna port in respect of uplink transmissions; and temporarily coupling the second antenna port to the first receiver chain at a point of entry thereof and in response to the received instruction, thereby redirecting temporarily a signal path from the second antenna port into the first receiver chain and then back into the second receiver chain downstream of the point of entry.

It is thus possible to provide an apparatus and method capable of mitigating the effects of applying unintended amplification settings to received signals that are redirected into different receiver chains. Additionally, the technical complexity involved with supporting TAS and transmission of SRS' is reduced, supported by a reduction in the number of duplexer components employed.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
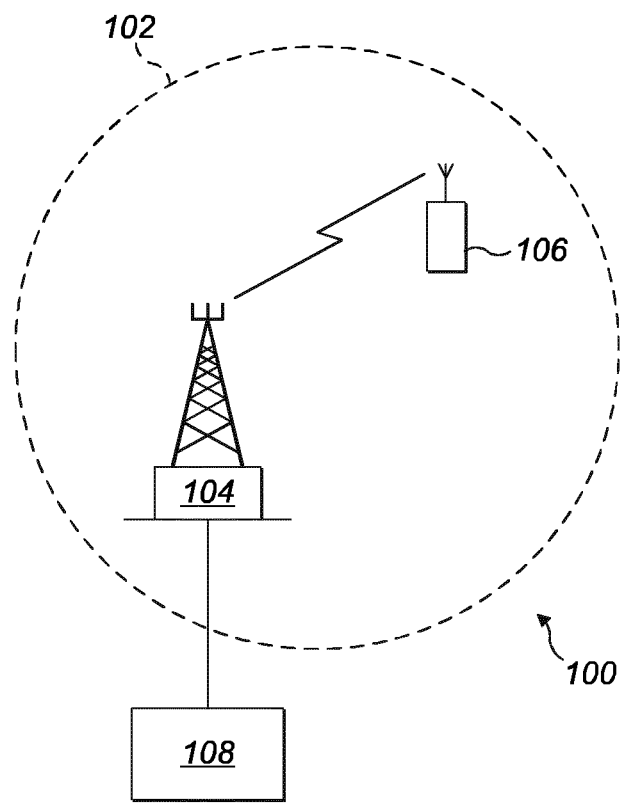
FIG. 1 is a schematic diagram of a user equipment unit operating in a part of a communications network.

Throughout the following description identical reference numerals will be used to identify like parts.

Referring to FIG. 1, in a wireless communications system, for example a Long Term Evolution (LTE) communications system 100, a communications network is supported by a plurality of cells arranged to provide wireless communications access over a geographic region. In this example, only a single cell is shown for the sake of simplicity and conciseness of description. However, the skilled person will appreciate that a greater number of cells is usually deployed throughout the communications network. In this respect, a cell 102 is supported by a base station, referred to as an evolved Node B (eNodeB) 104 in the context of the LTE communications system 100. The eNodeB 104 is capable of communicating wirelessly with a communications apparatus, for example a User Equipment (UE) unit 106, over an air interface. The eNodeB 104 is operably coupled to an Evolved Packet Core (EPC) 108. However, since the examples set forth herein concern the UE unit 106, for the sake of clarity and conciseness of description, further details of the wireless communications network infrastructure will not be described herein. Furthermore, whilst the examples set forth herein are described in the context of the LTE communications system 100, the skilled person will appreciate that the examples are applicable to other kinds of communications networks that support the use of multiple antennas and antenna selection, for example communications networks that operate in accordance with the Orthogonal Frequency Division Multiplexing (OFDM) communications scheme, such as communications networks operating in accordance with the Worldwide Interoperability for Microwave Access (WiMAX) communications standard and the WiFi standard (IEEE 802.11).

Figure 2:
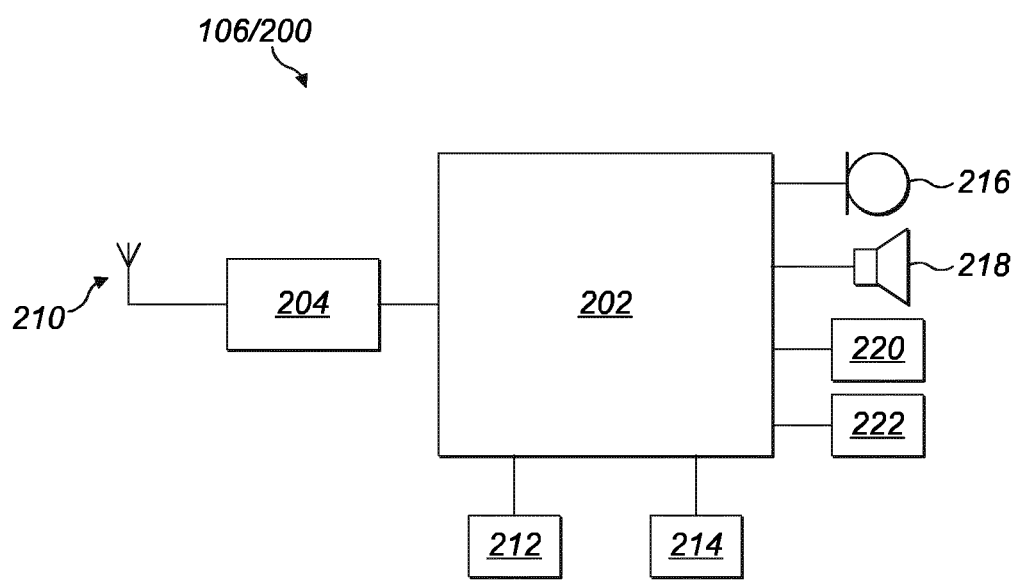
FIG. 2 is a schematic diagram of the user equipment unit of FIG. 1 in greater detail and constituting an embodiment of the invention.

Turning to FIG. 2, the user equipment (UE) device 106/200 operating in the LTE communications system 100, comprises a processing resource 202, the processing resource 202 being, in this example, a chipset of a cellular communications device. The processing resource 202 is coupled to a transceiver module 204, the transceiver module 204 being coupled to an antenna module 210.

The UE unit 200 also possesses a volatile memory, for example a RAM 212, and a non-volatile memory, for example a digital memory 214, each coupled to the processing resource 202. The processing resource 202 is also coupled to a microphone 216, a speaker unit 218, a keypad 220 and a display 222. The skilled person should appreciate that the architecture of the UE unit 200 described above comprises other elements, but such additional elements have not been described in detail herein for the sake of preserving conciseness and clarity of description.

The transceiver module 204 is supported by a hardware subsystem, the transceiver 204 being part of a modem of the UE unit 200. The modem is configured to provide wireless network access in accordance with the OFDM communications scheme, for example as defined in the LTE standard. In the examples set forth herein, the term modem should be understood to embrace any suitable signal modulation and/or demodulation apparatus capable of supporting operation in accordance with the OFDM communications scheme. The hardware subsystem is a collection of hardware and/or software elements that contributes, with other subsystems, to the transceiver module 204.

Figure 3:
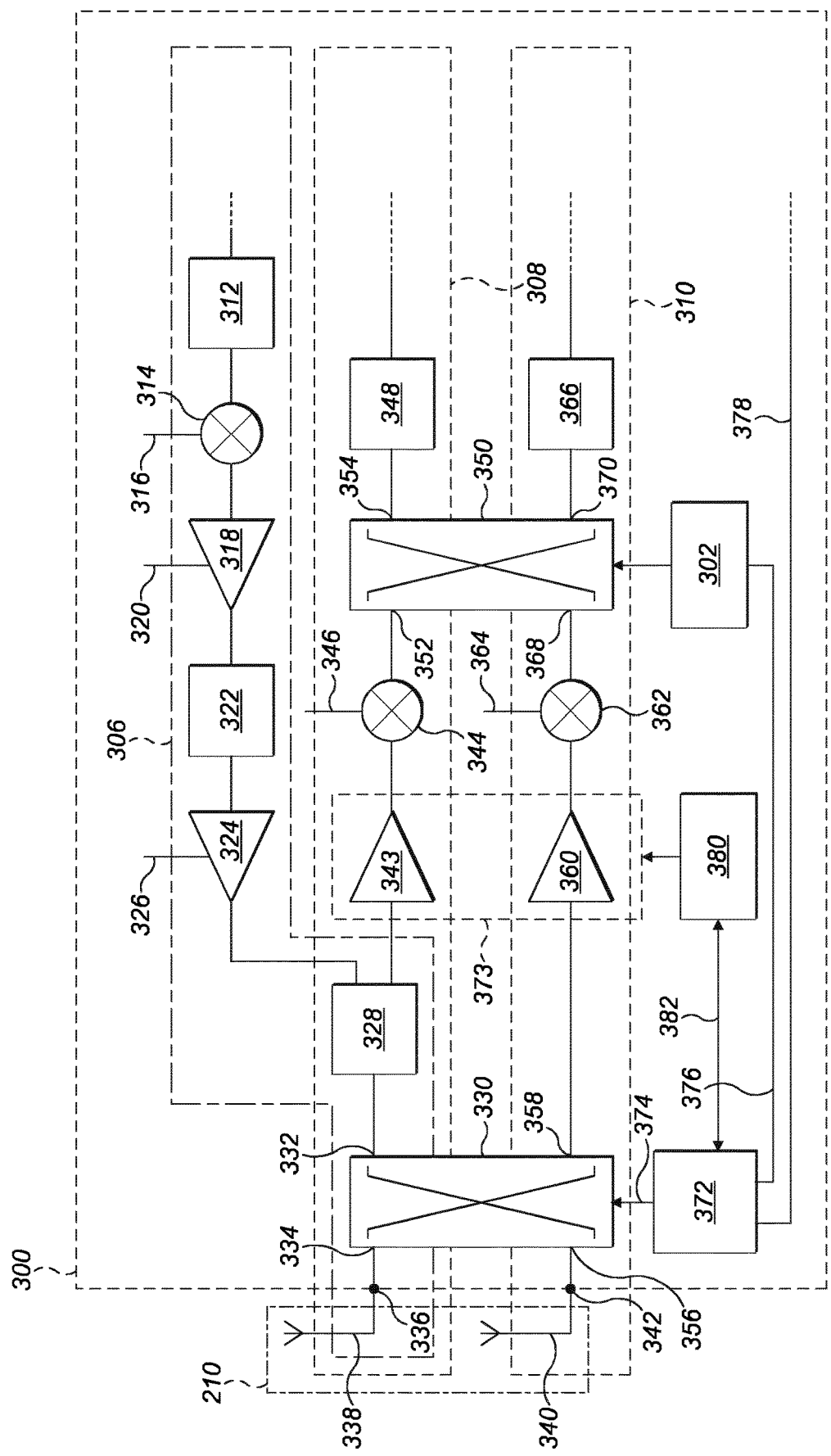
FIG. 3 is a schematic diagram of a part of a transceiver apparatus of the user equipment unit of FIG. 2 in greater detail.

Referring to FIG. 3, the hardware subsystem 300, which is configured in accordance with the OFDM communications scheme, comprises an Integrated Circuit (IC) to support the transceiver module 204 of FIG. 2. Although, in this example, a single IC is employed, the skilled person will appreciate that other implementations are possible in which the RF and baseband processing are performed using separate ICs, for example using a baseband IC and a Radio Frequency (RF) IC. In this example, the IC has RF processing components, which are functional components, arranged in stages. The IC also has baseband processing components, which are functional components arranged in stages. For receiver chains, these baseband processing components process incoming OFDM signals after they have been translated from being centred about a carrier frequency to being about a baseband range of frequencies, i.e. to a range of frequencies in which the carrier frequency has been removed. For a transmitter chain, the opposite applies, namely that a signal in the baseband range of frequencies, prior to being translated to the analogue domain and up-converted onto a carrier frequency, is processed by these components. For receiver chains, the RF processing components are functional components that are arranged in stages to down-convert received OFDM signals down to the baseband range of frequencies. For a transmitter chain, these are functional components arranged to modulate a received digital signal centred about a baseband range of frequencies onto a carrier signal.

In this, and other examples set forth herein, only a portion of the RF processing is described, because other components of the RF processing would be readily understood by the skilled person but have no bearing on the understanding of the inventive concepts expounded in the examples set forth herein. Consequently, such components will not be described in further detail herein. The examples set forth herein are therefore only described in the context of a response of the transceiver to a Transmit Antenna Select (TAS) command communicated on the Physical Downlink Control CHannel (PDCCH) and received by the transceiver.

As can be seen from FIG. 3, in this example the transceiver module 204 comprises a transmitter chain 306, a first receiver chain 308 and a second receiver chain 310. The RF processing components associated with the transmitter chain 306 comprises a Digital-to-Analogue Converter (DAC) component 312 having an input coupled to the baseband processing components. An output of the DAC component 312 is operably coupled to a transmit signal input of a transmit signal mixer component 314. The transmit signal mixer component 314 has a transmit local oscillator input 316 for receiving a transmit local oscillator signal. An output of the transmit signal mixer component 314 is operably coupled to an input of driver amplifier component 318 having a first gain control input 320. In this example, the driver amplifier component 318 operates in the analogue domain. An output of the driver amplifier component 318 is operably coupled to an input of a balun component 322, an output of the balun component 322 being operably coupled to an input of a power amplifier component 324, constituting an example of transmit path amplification, which in this example also operates in the analogue domain. The power amplifier component 324 comprises a second gain control input 326 and an output that is operably coupled to a transmit-side port of a duplexing component, for example a duplexer 328. Although not shown, the hardware sub-components can comprise multiple duplexers to support wireless network access to different communications networks operating in different frequency bands. A duplexer switch component (not shown) therefore provides a facility to switch between different duplexers as required by the UE unit 200.

A signal redirection system comprises, in this example, an antenna switch 330 having a first port 332 operably coupled to an antenna-side port of the duplexer 328. A second port 334 of the antenna switch 330 is coupled to a first antenna port 336 of the hardware subsystem 300. The signal redirection system, of course, comprises other functional components to support TAS functionality, which will be described later herein. Furthermore, the signal redirection system can reside solely amongst the RF processing components or can be distributed across both the RF processing components and the baseband processing components, depending upon implementation preferences. For example, and as will become apparent from another example described later herein, the signal redirection system can be formed in part from baseband processing components to provide some functionality of the signal redirection system in baseband.

Referring back to first antenna port 336, the first antenna port 336 is operably coupled to the antenna module 210. In this regard, the antenna module 210 comprises a first antenna 338 and a second antenna 340. The first antenna 338 is coupled to the first antenna port 336. The second antenna 340 is coupled to a second antenna port 342 of the hardware subsystem 300.

The first receiver chain 308 of the transceiver module 204 comprises the first antenna port 336 at an upstream end thereof, the duplexer 328, a receive-side port of the duplexer 328 being coupled to a first low-noise amplifier component 343. An output of the first low-noise amplifier component 343 is operably coupled to a receive signal input of a first receive signal mixer component 344 having a receive local oscillator input 346 for receiving a receive local oscillator signal. In this example, an output of the first receive signal mixer component 344 is operably coupled to an input of a first Analogue-to-Digital Converter (ADC) component 348 via a signal path reinstatement component, for example a signal switch 350. In this respect, the output of the first receive signal mixer component 344 is coupled to a first port 352 of the signal switch 350, a second port 354 of the signal switch 350 being coupled to the input of the first ADC component 348. An output of the first ADC component 348 is operably coupled to the baseband processing components of the IC mentioned above. In this example, the first receiver chain 308 comprises the first antenna port 336, the duplexer 328, the first low-noise amplifier component 343, the first receive signal mixer component 344 and the first ADC component 348, as well as subsequent downstream baseband processing components.

The second antenna port 342 is operably coupled to a third port 356 of the antenna switch 330. The second receiver chain 310 of the transceiver module 204 comprises the second antenna port 342 at an upstream end thereof. A fourth port 358 of the antenna switch 330 is operably coupled to a second low-noise amplifier component 360. An output of the second low-noise amplifier component 360 is operably coupled to a receive signal input of a second receive signal mixer component 362 having a receive local oscillator input 364 for receiving the receive local oscillator signal. In this example, an output of the second receive signal mixer component 362 is operably coupled to an input of a second ADC component 366 via the signal path reinstatement component, for example the signal switch 350. In this respect, the output of the second receive signal mixer component 362 is coupled to a third port 368 of the signal switch 350, a fourth port 370 of the signal switch 350 being coupled to the input of the second ADC component 366. An output of the second ADC component 366 is also operably coupled to the baseband processing components of the IC mentioned above. In this example, the second receiver chain 310 comprises the second antenna port 342, the second low-noise amplifier component 360, the second receive signal mixer component 362 and the second ADC component 366, as well as subsequent downstream baseband processing components.

In this example, the first and second low-noise amplifier components 343, 360 constitute part of receive path amplification of the transceiver module 204. Furthermore, the first receiver chain 308 comprises the receive path amplification, constituting a portion of the first receiver chain 308, and a first downstream processing portion that includes baseband processing stages. Similarly, the second receiver chain 310 comprises the receive path amplification, constituting a portion of the second receiver chain 310, and a second downstream processing portion that includes baseband processing stages.

In order to coordinate operation of the antenna switch 330 and the signal switch 350 and also support other desirable signal processing measures associated with coordination of the operation of the antenna switch 330 and the signal switch 350, the signal redirection system comprises a controller, for example a TAS management component 372, the TAS management component 372 being operably coupled to the antenna switch 330 by a first control line 374 and to a delay component 302 by a second control line 376, the delay component being operably coupled to the signal switch 350. The TAS management component 372 is also operably coupled to the baseband processing components by an antenna selection line 378. The TAS management component 372 is further coupled to an Automatic Gain Control (AGC) component 380 via an AGC communications line 382, the AGC component 380 being operably coupled to the receive path amplification mentioned above.

Figure 4:
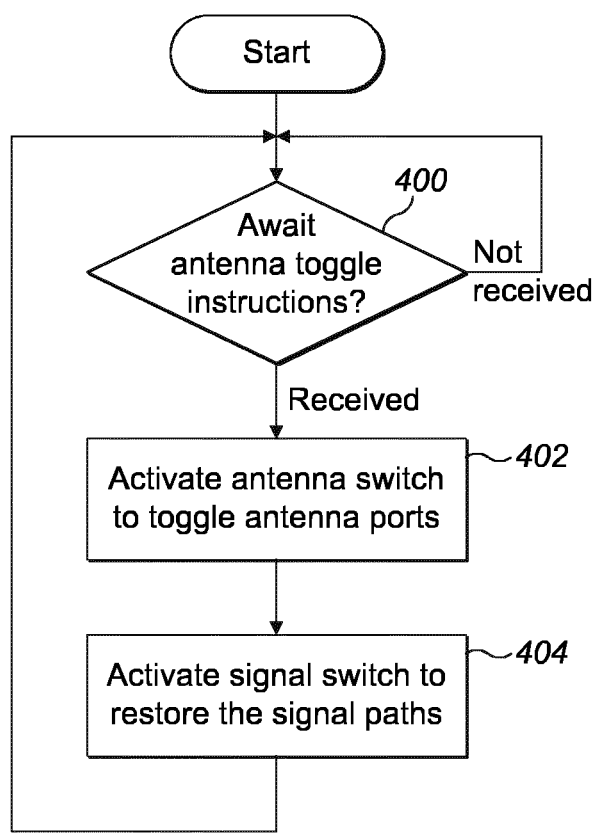
FIG. 4 is a flow diagram of a part of a method of processing a signal in respect of the transceiver apparatus of FIG. 3 constituting another embodiment of the invention.

In operation (FIGS. 4 to 6), and prior to use of TAS, downlink and uplink signals are processed by the RF and baseband processing components in a manner that the skilled person would expect. In this respect, amongst the various functionality supported by the UE unit 200, the baseband and RF processing components of the UE unit 200 are configured to generate and transmit Sounding Reference Signals (SRSs) in accordance with the LTE standard. The generation and transmission of an SRS can be in conformance with a periodic mode of operation or an on-demand mode of operation. As the techniques for generating and transmitting the SRS and the circumstances in which the SRS is transmitted is known to the skilled person, further details concerning the transmission of the SRS will not be described further herein.

The eNodeB 104 receives the SRSs from the UE unit 200 and uses the SRSs to calculate channel quality. Channel qualities are calculated in respect of each uplink channel associated with each antenna of the UE unit 200 and each antenna of the eNodeB 104, the calculated channel qualities being used by the eNodeB 104 in order to decide or assist in deciding whether the first antenna 338 or the second antenna 340 should be used for uplink communications between the UE unit 200 and the eNodeB 104.

When the eNodeB 104 decides that the UE unit 200 should switch antennas used to transmit uplink signals, the eNodeB 104 transmits a TAS instruction to the UE unit 200. The TAS instruction is transmitted to the UE unit 200 by the eNodeB 104 using the PDCCH.

In this example, the UE unit 200 initially transmits uplink signals using the first antenna 338. As such, the antenna switch 330 is connecting the duplexer 328 to the first antenna port 336. The first receiver chain 308 is therefore configured to process signals received via the first antenna port 336. The antenna switch 330 is also connecting the second antenna port 342 to the second low-noise amplifier component 360 and so the second receiver chain 310 is configured to process signals received via the second antenna port 342. This particular initial configuration is purely exemplary and the converse configuration is equally possible as an initial configuration.

During operation employing this particular antenna-to-receiver chain correspondence, the eNodeB 104 decides to instruct the UE unit 200 to swap antennas being used for uplink communications and so the UE unit 200 subsequently receives the TAS instruction. The TAS instruction is received and processed in cooperation by the RF and baseband processing components. Once decoded, a number of the baseband processing components cooperate to generate an antenna toggle instruction that is communicated on the antenna selection line 378 to the TAS management component 372, which is awaited (Step 400) by the TAS management component 372.

In response to receipt of the antenna toggle instruction, the TAS management component 372 instructs (Step 402) the antenna switch 330 to connect the duplexer 328 to the second antenna port 342 and hence the second antenna 340, and to connect the input of the second low-noise amplifier component 360 to the first antenna port 336 and hence the first antenna 338. This then results in a first signal receive path, which is meant to extend from the first antenna port 336 along the first receiver chain 308, instead following a part of a second signal receive path, the second signal receive path being meant to extend from the second antenna port 342 along the second receiver chain 310. The converse applies in respect of the second signal receive path, which is made to follow a part of the first signal receive path, i.e. vice versa. Hence, it can be seen that the signal redirection system, and in particular the antenna switch 330 in this example, controls coupling of the receive path amplification and the first and second antenna ports 336, 342.

Whilst this toggling of antenna port connections suits the uplink requirements of the eNodeB 104, the first receiver chain 308 and the second receiver chain 310 have been configured for use with specific antenna ports and this configuration envisages certain channel conditions, and so switching the antenna ports connected to the first and second receiver chains 308, 310 serves to degrade performance of demodulation of downlink communications using the first and second receiver chains 308, 310, because the receiver chains 308, 310 suddenly have to process signals subjected to different channel conditions than expected. Such disruption to the expected processing of received signals can occur during transmission of non-sounding data by the UE unit 200 or when antenna toggling needs to take place for the purpose of the performance of sounding.

It has been recognised that the effects caused by switching antenna connections can be mitigated by preventing or minimising the signals received at the first and second antenna ports 338, 342, and made to follow unintended, i.e. each other's, signal paths, from being processed by the remainder of the first and second receiver chains 308, 310, respectively, following the receive path amplification stage 373. This requires the signal redirection system to couple only temporarily the second antenna port 342, for example, to the first receiver chain 308, thereby redirecting temporarily the second signal path from the second antenna port 342 into the first receiver chain 308 and then back into the second receiver chain 310 downstream of the point of entry/redirection. Likewise, in this example, the signal redirection system couples only temporarily the first antenna port 338, for example, to the second receiver chain 310, thereby redirecting temporarily the first receive signal path from the first antenna port 336 into the second receiver chain 310 and then back into the first receiver chain 308 downstream of the point of entry/redirection.

To achieve this in respect of the use case where antenna toggling is required when the UE unit 200 is transmitting data, for example lasting a number of symbols in duration, the TAS management component 372 instructs (Step 404) the signal switch 350 to connect the output of the first receive signal mixer component 344 into the second receiver chain 310 and, in particular, to the second downstream processing portion of the second receiver chain 310, for example by connecting the output of the first receive signal mixer component 344 to the input of the second ADC 366. Likewise, the signal switch 350 connects the output of the second receive signal mixer component 362 into the first receiver chain 308 and, in particular, to the first downstream processing portion of the first receiver chain 308, for example by connecting the output of the second receive signal mixer component 362 to the input of the first ADC component 348. In order to ensure that only the data corresponding to analogue signals, in the respective receive chains, which have been subjected to switching (and optionally amplification) are redirected back into the proper receiver chains 308, 310 associated with the antenna ports 336, 342 from which the analogue signals originated, the instruction issued by the TAS management component 372 to the signal switch 350 is subjected to a delay by the delay component 302 in order to allow the data already propagating through the first and second receiver chains 308, 310, to clear the signal switch 350 so as to be unaffected by measures to compensate for the response of the UE unit 200 to the TAS instruction, i.e. the switching of the antenna ports 336, 342 by the antenna switch 330. In respect of signals affected by the switching by the antenna switch 330, and in respect of the first receiver chain 308, the signal path associated with the first antenna port 336 is temporarily redirected into a portion of the second receiver chain 310 and, in respect of the second receiver chain 310, the signal path associated with the second antenna port 342 is temporarily redirected into a portion of the first receiver chain 308. Hence, it can be seen that the signal redirection system controls coupling of the receive path amplification and the first and second downstream processing portions of the first and second receiver chains 308, 310, respectively. Furthermore, the TAS management component 372 coordinates the temporary redirection of signal paths and the coordination of the temporary redirection is controlled temporally by the TAS management component 372. However, where antenna toggling needs to be performed faster, for example in the case where toggling is required for sounding in the absence of the UE unit 200 needing to transmit non-sounding data, the switching performed by the signal switch 350 in the analogue domain can alternatively be performed in the digital domain as will be described later herein unless the switching performed by the signal switch 350 in the analogue domain can be performed with sufficient speed in order to respond within a sufficient time frame before the antenna port connectivity needs to be toggled back to a preceding arrangement.

Figure 5:
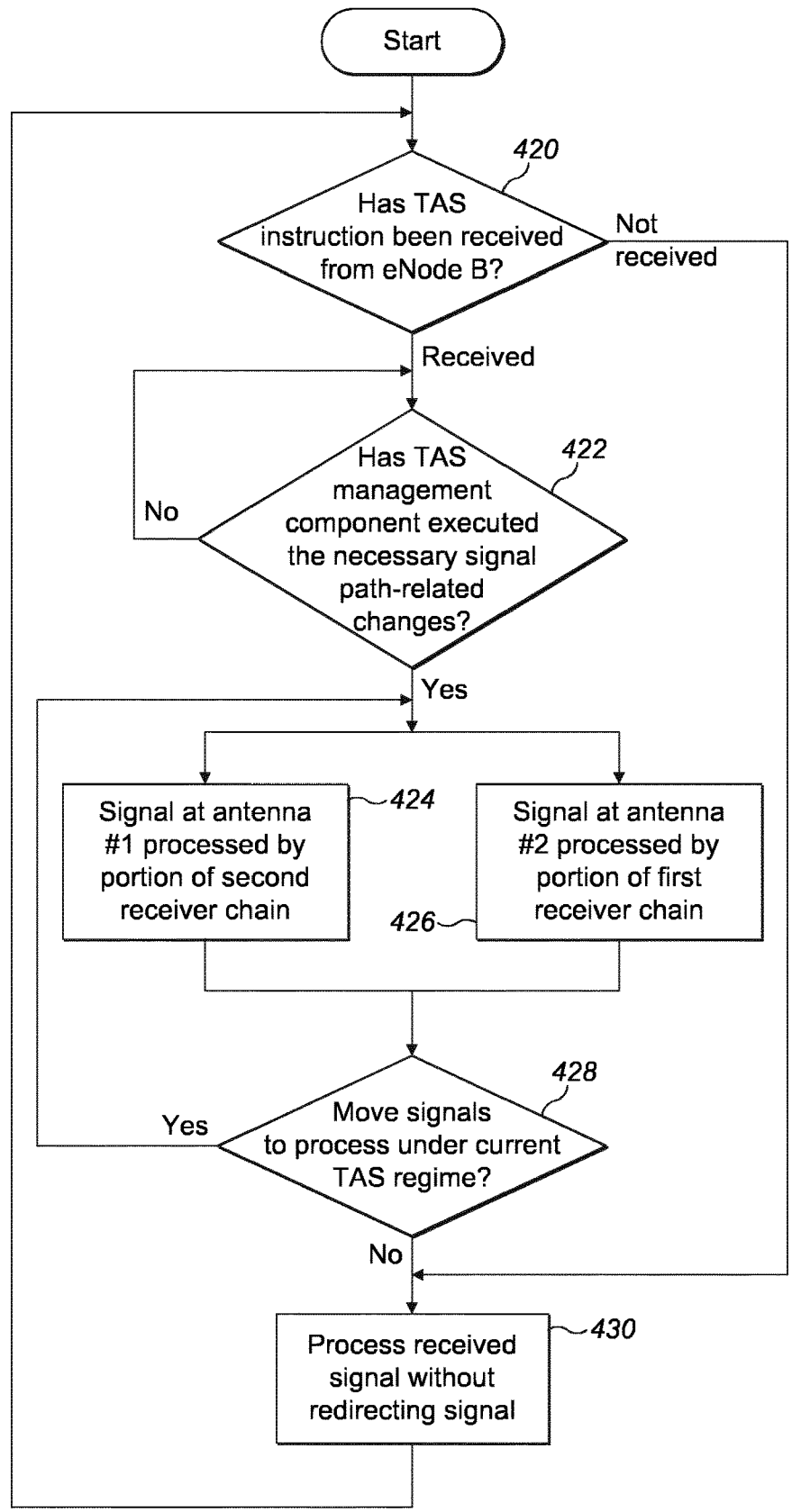
FIG. 5 is a flow diagram of the method of FIG. 4 in further detail.

Referring to FIG. 5, following receipt (Step 420) of the TAS instruction and while the transition implemented by the TAS management component 372 and the antenna switch 330 is in effect (Step 422), a first signal intended for the first signal path is received at the first antenna 338 and converted to a first received RF signal, which is applied to the first antenna port 336. However, as a result of the toggling of the antenna ports mentioned above, the antenna switch 330 forces the first received RF signal to follow the second receive signal path (Step 424) of the second receiver chain 310, albeit temporarily as a result of the actions of the signal switch 350. However, initially, the first received RF signal is applied to the input of the second low-noise amplifier component 360 and amplified by the second low-noise amplifier component 360 before being mixed down to baseband frequencies by the second receive signal mixer component 362 to yield a first receive baseband signal that is applied to the third port 368 of the signal switch 350. Thereafter, the signal switch 350 redirects the first receive baseband signal back into the first receiver chain 308 for processing by the downstream processing portion of the first receiver chain 308, for example the first ADC component 348 where the first receive baseband signal is converted from the analogue domain to the digital domain before being processed by subsequent processing stages, for example those supported by the baseband processing components.

Likewise, a second signal intended for the second signal path is received at the second antenna 340 and converted to a second received RF signal, which is applied to the second antenna port 342. However, as a result of the toggling of the antenna ports mentioned above, the antenna switch 330 forces the second received RF signal to follow (Step 426) the first receive signal path of the first receiver chain 308, albeit temporarily as a result of the actions of the signal switch 350. However, initially, the second received RF signal is applied to the input of the duplexer 328 and then propagates to the first low-noise amplifier component 343 for amplification before being mixed down to baseband frequencies by the first receive signal mixer component 344 to yield a second receive baseband signal that is applied to the first port 352 of the signal switch 350. Thereafter, the signal switch 350 redirects the second receive baseband signal back into the second receiver chain 310 for processing by the downstream processing portion of the second receiver chain 310, for example the second ADC 366 where the second receive baseband signal is converted from the analogue domain to the digital domain before being processed by subsequent processing stages, for example those supported by the baseband processing components. The return of the first and second baseband signals back to their proper receiver chains constitutes completion of the temporary redirection of the signal paths.

The above processing of downlink signals is continued whilst the TAS instruction is being implemented by the TAS management component 372 (Step 428) until the switching of signal processing paths is reversed. Thereafter, the transceiver module 204 continues to process (Step 430) signals received at the first and second antenna ports 336, 342 without modification to the paths followed by signals until a subsequent TAS instruction is received (Step 420) and the TAS management component 372 has modified downlink processing in the first and second receiver chains 308, 310 (Step 422) in the manner already described above.

As can be seen, a predetermined processing relationship between an antenna port and a downstream processing portion of a receiver chain is maintained by the signal redirection system. For example, the predetermined processing relationship is maintained between the first and second downstream processing portions of the first and second receiver chains 308, 310 and the first and second antenna ports 336, 342.

In another embodiment, further measures are taken by the TAS management unit 372 in relation to amplification of the signals by the receive path amplification 373, because the first and second low-noise amplifier components 343, 360 are configured with the expectation that the RF signal to be amplified by the first low-noise amplifier component 343 is the first RF signal received at the first antenna port 336 and the RF signal to be amplified by the second low-noise amplifier component 360 is the second RF signal received at the second antenna port 342.

Following the TAS instruction, and implementation of signal path switching in response thereto, the UE unit 200 needs to transmit a signal, for example a non-sounding or non-reference signal, at a next boundary between uplink symbols. However, the boundaries between downlink symbols are not necessarily in synchronism with uplink symbol boundaries due to the use of timing advance to synchronise uplink transmissions. The need to start processing symbols from switched antennas can therefore begin mid-way through receipt of downlink symbols and not at a boundary between downlink symbols, which would be preferable.

As mentioned above, the amplification applied to signals received via the first and second antenna ports 336, 342 is therefore suddenly swapped and this can impact on the processing of the first RF signal and the second RF signal received initially and respectively via the first antenna port 336 and the second antenna port 342.

Figure 6:
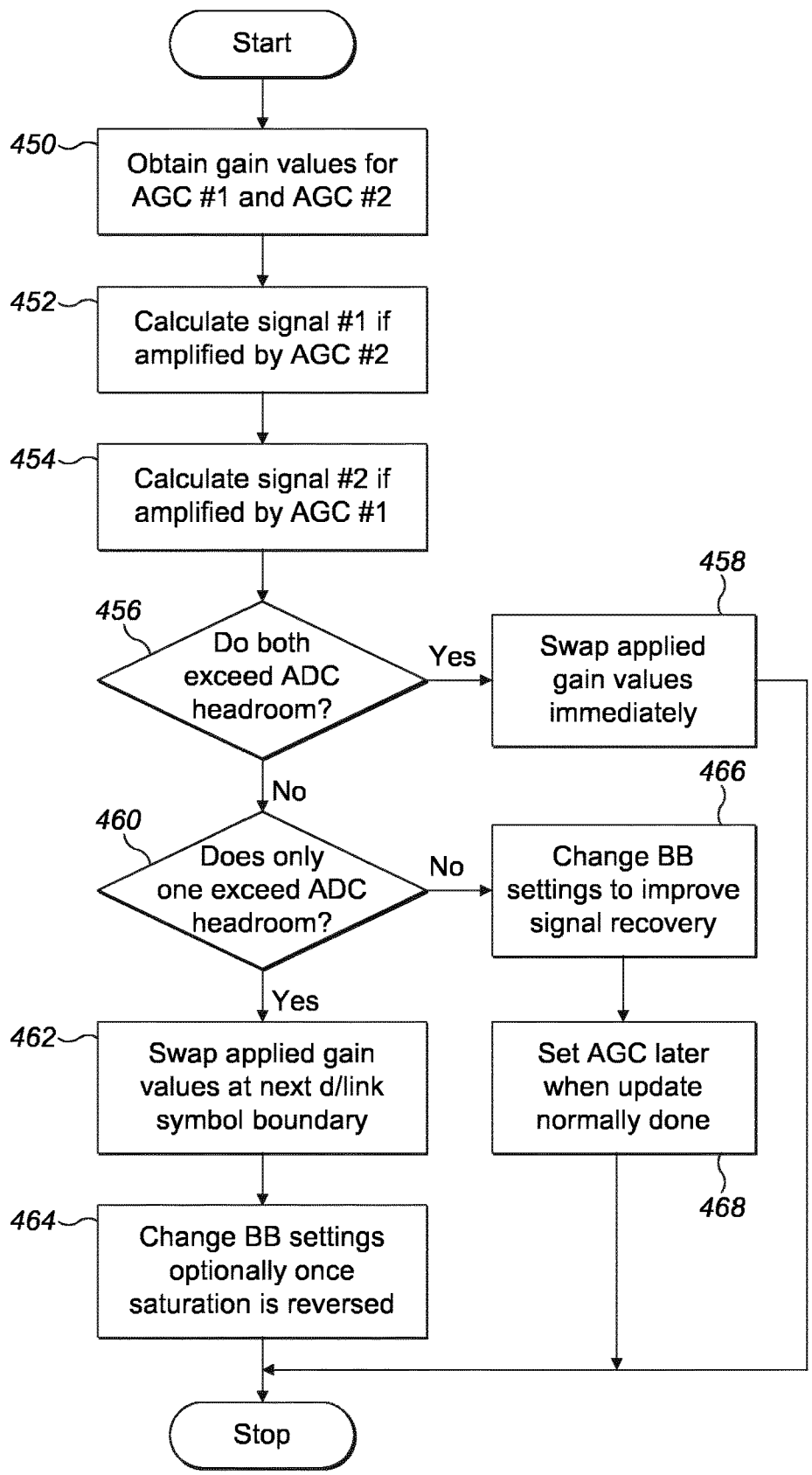
FIG. 6 is a flow diagram of an improvement to the method of FIG. 4.

In order to mitigate the effects of applying swapped amplification to the first and second RF signals, i.e. amplification of the second receiver chain 310 to the first RF signal and amplification of the first receiver chain 308 to the second RF signal, the signal redirection system applies the following measures. Turning to FIG. 6, in the event that the uplink symbol boundaries are in synchronism with the downlink symbol boundaries, the TAS management component 372 can simply apply the Automatic Gain Control (AGC) settings of the first receiver chain 308 to the receive chain amplification of the second receiver chain 310 and the AGC settings of the second receiver chain 310 to the receive chain amplification of the first receiver chain 308. This serves to ensure that the first RF signal and the second RF signal are correctly amplified despite temporarily following each other's signal path instead of their own. However, as is more commonly the case, the boundaries of the uplink symbols are not in synchronism with the boundaries of the downlink symbols. The LTE standard does not permit the UE unit 200 to wait for a subsequent downlink symbol boundary following actioning of the TAS instruction by the signal redirection system to transmit the data and so the signal redirection system sometimes implements measures to mitigate the effects of the wrong amplification being applied to the RF signals received at the first and second antenna ports 336, 342.

Consequently, when the antenna toggle instruction is received by the TAS management 372 on the antenna selection line 378, the TAS management component 372 obtains (Step 450) first AGC settings in respect of the first receiver chain 308 and second AGC settings in respect of the second receiver chain 310 from the AGC component 380 via the AGC communications line 382. However, in order to mitigate signal distortion, the TAS management component 372 retains signal headroom threshold data in respect of the first and second ADC components 348, 366. In this respect, in order for the first and second ADC components 348, 366 to perform correctly, the level (amplitude) of signals to be digitised that are applied to the inputs of the ADCs should be such that the full ranges of bits of the ADCs are used, but without causing an overflow. A consequence of the level of the input signal being too high is that the overflow caused results in clipping or distortion of the digitised signal at the respective outputs of the first and second ADC components 348, 366. In order to determine whether such distortion is likely to occur by using AGC settings intended for a different receiver chain, the TAS management component 372 uses the AGC settings obtained to calculate (Steps 452 and 454) the effects of the application of the first and second AGC settings on the second and first RF signals, respectively, when the first and second AGC settings are intended to be applied in respect of the first and second RF signals. The calculations (Step 452 and 454) are performed in order to determine (Step 456) whether application of the AGC settings in a unintended manner results in the respective levels of the amplified signals exceeding the maximum signal headroom threshold of the first and second ADC components 348, 366.

In the event that the TAS management component 372 determines that incorrect amplification of the first and second RF signals results in the signal headroom threshold of the first and second ADC components 348, 366 being exceeded by amplification of both of the first and second RF signals, the TAS management component 372 instructs the AGC component to swap (Step 458), i.e. re-programming takes place, as immediately as possible (on account of implementation delays associated with the step-wise nature of setting the gains of the first and second low-noise amplifier components 343, 360) the gain settings applied in respect of the first and second receiver chains 308, 310.

Alternatively, if the calculation determines that incorrect amplification of both the first and second RF signals does not result in the signal headroom threshold being exceeded in respect of both the first and second RF signals, then the TAS management component 374 determines (Step 460) if incorrect amplification of both the first and second RF signals only results in one of the amplified signals exceeding the signal headroom threshold. In the event that the signal headroom threshold has been determined to have been exceeded by amplification of one of the first and second RF signals, the TAS management component 374 instructs the AGC component 380 to swap (Step 462), i.e. re-programming takes place, the AGC settings applied in respect of the first and second receiver chains 308, 310 at the next boundary of downlink symbols. Optionally, the signal redirection system sets (Step 464) baseband processing parameters once saturation of the ADCs has been reversed as a result of applying the correct AGC settings in respect of the first and second receiver chains 308, 310.

If, however, none of the amplified first and second RF signals results in saturation of the first and second ADC components 348, 366, then as a temporary measure, the signal redirection system sets (Step 466) baseband processing parameters in order to improve symbol demodulation and the TAS management component 372 instructs the AGC component 380 to swap (Step 468), i.e. re-programming takes place, the AGC settings applied in respect of the first and second receiver chains 308, 310 at the next boundary of downlink symbols.

The changes made above are applied until the above-described antenna selection change is reversed, for example countermanded. The skilled person should also appreciate that when the AGC settings are applied by the AGC component 380, the applications of these settings is incremental in nature and a number of AGC update cycles can sometimes need to be undergone before the AGC settings being applied are achieved.

The signal switch 350 constitutes a specific example of a signal path reinstatement component, such as a signal return component. In this regard, the signal path reinstatement component can be any suitable mechanism, which may be a physical component or a software code module or a combination thereof capable of returning a signal path back to a processing path for which it was predetermined, for example, originally intended. As such, the skilled person should appreciate that the signal path reinstatement component need not necessarily reside amongst the RF processing components and can be located elsewhere in the downstream processing portions of the first and second receiver chains 308, 310, for example amongst the baseband processing components.

Figure 7:
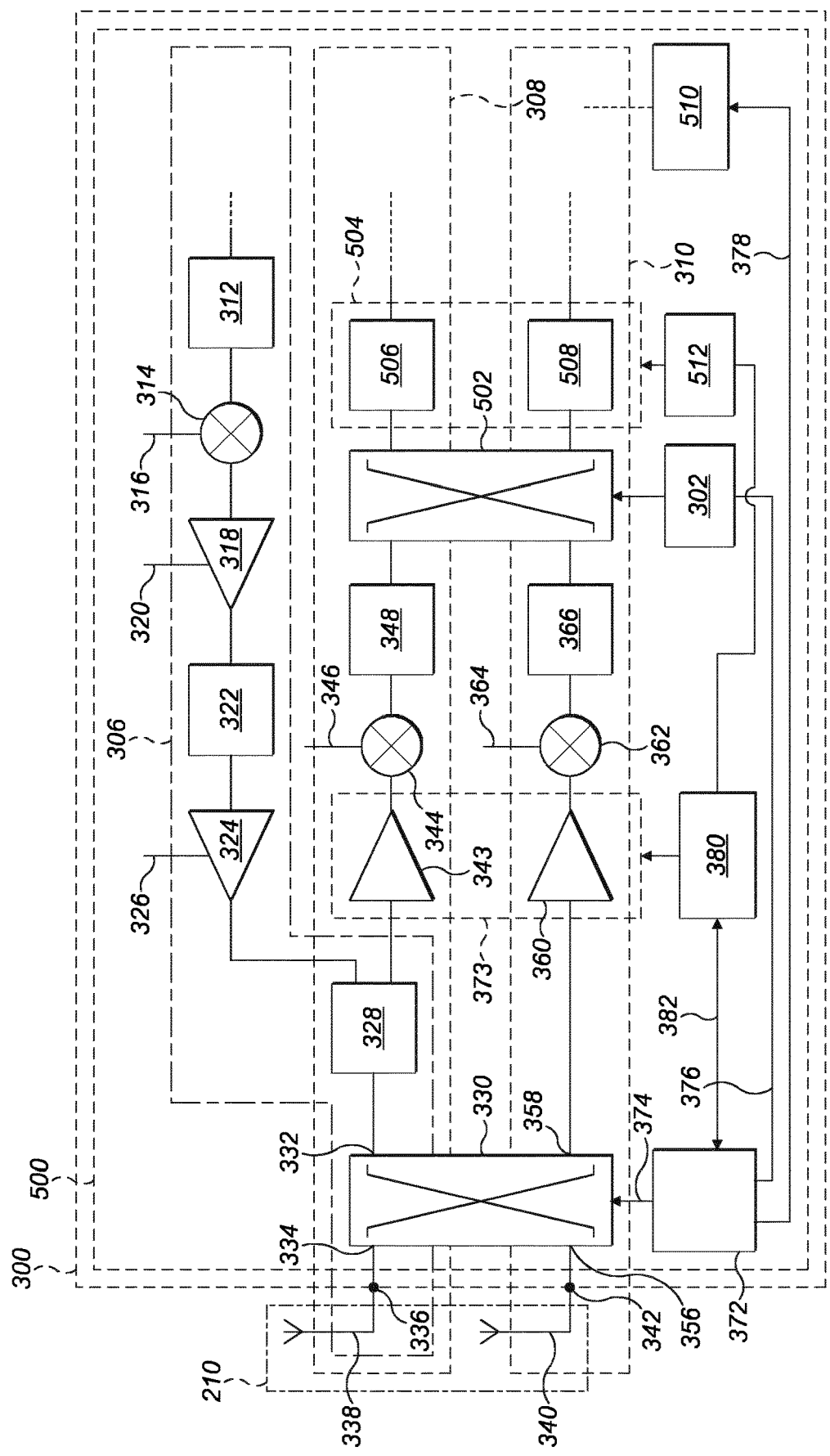
FIG. 7 is a schematic diagram of a part of the transceiver apparatus of the user equipment unit of FIG. 3 and constituting a further embodiment of the invention.

It should also be appreciated that the function performed by the signal switch 350 can be located at any point in the first and second receiver chains 308, 310 downstream of the duplexer 328, for example immediately prior to the receive path amplification stage 373. However, processing benefits can be realised by locating the signal switch 350 as shown in FIG. 3 on account of the lower frequency of the signals at the stage in the first and second receiver chains 308, 310 shown. Referring to FIG. 7, in another embodiment, a single transceiver IC 500 is again employed for performing both RF and baseband signal processing. However, the architecture of the preceding example is modified so that the operation performed by the signal switch 350 is performed in the digital domain rather than the analogue domain and so lends itself better to implementation as part of baseband signal processing.

In this respect, the physical signal switch 350 is no longer employed and so the architecture of the preceding example is modified as follows. The output of the first receive signal mixer component 344 is operably coupled to the input of the first ADC component 348. Similarly, the output of the second receive signal mixer component 362 is operably coupled to the input of the second ADC component 366. In this example, the output of the first ADC component 348 is operably coupled to a buffer 502, for example a memory component. Similarly, the output of the second ADC component 366 is operably couple to the buffer 502. Although, in FIG. 7, separate inputs to the buffer 502 are depicted, the skilled person will appreciate that these are conceptual and used simply to assist in understanding the flow of data through the first and second receiver chains 308, 310. Consequently, the buffer 502 is also operably coupled to digital receive amplification 504 comprising a first digital gain component 506 and a second digital gain component 508, each having inputs respectively coupled to the buffer 502. Outputs of the first and second digital gain components 506, 508 are operably coupled to other baseband processing components of the first and second receiver chains 308, 310, respectively. Since the identity and function of the other baseband processing components would be readily understood by the skilled person, but have no bearing on the understanding of the inventive concepts expounded in the examples set forth herein, such components will not be described in further detail herein. However, it should be appreciated that following conversion to the digital domain, the subsequent digital processing constitutes algorithmic data processing, such as algorithmic baseband data processing. In the context of the terminology set forth above, the first downstream processing portion and the second downstream processing portion respectively comprise a first algorithmic data processing path and a second algorithmic data processing path.

The transceiver IC 500 also comprises a PDCCH decoder 510 for extracting the TAS instruction, from the PDCCH, to be communicated to the TAS management component 372. In this example, the AGC component 380 is also operably coupled to the digital receive amplification 504 via a further delay component 512 in order to control the first digital gain component 506 and the second digital gain component 508.

In operation, the transceiver IC 500 operates in a like manner to that described above in relation to FIG. 3. However, instead of performing switching of analogue signals to reinstate the signal paths, i.e. to reverse the signal path change of the antenna switch 330, the buffer 502 is used to adjust the flow of the data through the first and second receiver chains 308, 310. In order to ensure that only the data corresponding to analogue signals that have been switched and amplified by opposing low-noise amplifier components 343, 360 are redirected back into the proper receiver chains 308, 310 associated with the antenna ports 336, 342 from which the analogue signals originated, the instruction issued by the TAS management component 372 to the buffer 502 on the second control line 376 is subjected to a delay by the delay component 302 in order to allow the data corresponding to the switched analogue signals to reach the buffer 502 and not to redirect data corresponding to extant analogue signals received that have not had their respective signal paths switched, but are still passing through the receiver chains 308, 310.

As the redirection of the data paths is being performed by the buffer 502, the skilled person should appreciate that this can be achieved by a number of different techniques, for example by manipulation of pointers used to access the data stored by the buffer 502 when providing the stored data to the first and second digital gain components 506, 508. As such, when the first digital gain component 506 accesses the buffer 506, the data stored in respect of the second receiver chain 310 is accessed and when the second digital gain component 508 accesses the buffer 506, the data stored in respect of the first receiver chain 308 is accessed. Consequently, as a result of use of data access in this way, the signal path reinstatement component ensures sample data in respect of the first antenna port 336 is processed by the first algorithmic data processing path and the sample data in respect of the second antenna port 342 is processed by the second algorithmic data processing path. In this respect, when stored, the sample data in respect of the first antenna port 336 is stored in respect of the second algorithmic data processing path and the sample data in respect of the second antenna port 342 is stored in respect of the first algorithmic data processing path. However, this "crossover" storage is reversed by modification of the access to the stored sample data as described above.

As described earlier, but shown in greater detail in FIG. 7, baseband processing parameters can be modified in order to compensate for processing of signals using swapped, and therefore unintendedly applied, parameters. In this respect, an example of modification of the baseband processing parameters is modifying the digital gain applied by the first and/or second digital gain components 506, 508 by the AGC component 308.

As also shown in greater detail in relation to FIG. 7, the PDCCH decoder 510 receives data in respect of the PDCCH and extracts the TAS instruction and generates the antenna toggle instruction to the TAS management component 372 on the antenna selection line 378. In the context of separate RF and baseband ICs, the PDCCH decoder 510 would, for example, be implemented in the baseband IC.

In the example of FIG. 7, the redirection and reinstatement of signals in the first and second receiver chains 308, 310 is simply achieved in a slightly different manner. In this respect, the reinstatement of the signal path is still performed, albeit in the digital domain.

In the example of the use case where toggling of the antenna ports 336, 342 lasts for a relatively short period of time, for example the duration of one symbol, for the purpose of performing sounding in the absence of transmission of non-sounding data, and assuming the receive path amplification 373 is unable to respond sufficiently quickly to provide effective receive path amplification in respect of the duration of the performance of the sounding, the amplification can be performed in the digital domain irrespective of whether the signal path reinstatement is performed in the analogue or digital domain. Indeed, if a periodic sounding scheme is employed requiring fast switching between antennas, it is unlikely that sufficient time is available for the AGC component 380 to update the settings of the first and second low-noise amplifier components 343, 360 in time before it is time to switch antennas again, although it is recognised that such fast adjustment of antenna coefficients may be possible with advancements in technology and/or a sufficiently long symbol duration of a given communications standard. However, in such circumstances, the baseband processing parameters are adjusted in order to mitigate the effects of the rapid switching between antennas that is sometimes implemented in accordance with the LTE standard.

As mentioned in the above examples, the delay component 302 and the further delay component 512 are employed to delay respectively switching by the signal switch 350, the buffer 502 and the digital receive amplification 504, depending upon the implementation being used. In order to ensure that a correct delay is applied, thereby ensuring premature or late switching is avoided, the delay to be applied can be determined by way of calibration measurements performed, for example, during a factory calibration process.

The skilled person should appreciate that the above-described implementations are merely examples of the various implementations that are conceivable within the scope of the appended claims. Indeed, the skilled person should appreciate that descriptions herein of the execution of antenna switching/selection can, in accordance with the LTE standard, be performed in different ways. For example, although reference is made to sounding signals in the above examples, the skilled person should appreciate that the above examples are equally applicable in the context of other reference signals that can be used in relation to the LTE and/or other communication standards that are communicated to the eNodeB or any analogous entity for the purpose of estimating channel properties.

For the avoidance of doubt, use of the term "downlink" refers to communications from an eNodeB to a UE unit. The UE unit 200 therefore possesses, in the examples set forth herein, downlink receiver chains. Similarly, use of the term "uplink" refers to communications from a UE unit to an eNodeB. The UE unit 200 therefore possesses, in the examples set forth herein, an uplink transmitter chain.

The systems and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While specific examples of the invention have been described above, the skilled person will appreciate that many equivalent modifications and variations are possible. Accordingly, the exemplary embodiments of the invention set forth above are considered to be illustrative and not limiting. Various changes to the described embodiments may be made without departing from the spirit and scope of the invention.

The invention claimed is:

1. A transceiver apparatus configured to support antenna selection in accordance with a communications standard, the apparatus comprising:
 a hardware subsystem comprising:
  a duplexing component;
  a transmitter chain; and
  a first receiver chain and a second receiver chain respectively comprising:
   a first antenna port and a second antenna port at an upstream end thereof;
   a first downstream processing portion comprising a first algorithmic data processing path; and
   a second downstream processing portion comprising a second algorithmic data processing path;
   wherein the first receiver chain and the transmitter chain share the duplexing component; and
 a signal redirection system comprising a signal path reinstatement component and arranged to:
  couple temporarily the second antenna port to the first receiver chain at a point of entry thereof and in response to an antenna selection instruction, thereby redirecting temporarily a signal path from the second antenna port into the first receiver chain and then back into the second receiver chain downstream of the point of entry; and
  maintain a predetermined processing relationship between the first and second downstream processing portions and the first and second antenna ports,
 wherein:
  the first and second downstream processing portions comprise the signal path reinstatement component; and
  the signal path reinstatement component is arranged to:
   ensure sample data in respect of the second antenna port is processed by the second algorithmic data processing path, wherein the sample data is stored in a memory in respect of the first algorithmic data processing path; and
   modify access to the sample data so that the sample data is processed by the second algorithmic data processing path instead of the first algorithmic data processing path.

2. The apparatus according to claim 1, wherein a portion of the first receiver chain comprises receive path amplification and a portion of the second receiver chain also comprises the receive path amplification.

3. The apparatus according to claim 2, wherein the signal redirection system is arranged to control coupling between the receive path amplification and the first and second antenna ports.

4. The apparatus according to claim 1, wherein the signal redirection system is arranged to control coupling between the receive path amplification and the first and second downstream processing portions.

5. The apparatus according to claim 1, wherein the signal redirection system comprises an antenna switch operably coupled to the first and second antenna ports and the receive path amplification.

6. The apparatus according to claim 1, wherein
 a portion of the first receiver chain comprises receive path amplification and a portion of the second receiver chain also comprises the receive path amplification;
 the signal redirection system comprises an antenna switch operably coupled to the first and second antenna ports and the receive path amplification; and
 the antenna switch is operably coupled to the receive path amplification in respect of the first receiver chain via the duplexing component.

7. The apparatus according to claim 5, wherein the transmitter chain comprises transmit path amplification and the antenna switch is coupled to the transmit path amplification via the duplexing component.

8. The apparatus according to claim 1, wherein the signal path reinstatement component is arranged to return the signal path redirected into the first receiver chain and originating from the second antenna port back to the second downstream portion of the second receiver chain, thereby maintaining the predetermined processing relationship between the second downstream processing portion and the second antenna port.

9. The apparatus according to claim 2, further comprising:
a controller arranged to coordinate the temporary redirection of the signal path from the second antenna port into the first receiver chain;
wherein:
the first receiver chain comprises a first analog-to-digital converter having a first maximum signal headroom threshold requirement associated therewith; and
the controller is arranged to determine whether application of the receive path amplification in respect of the first receiver chain to a first signal received via the second antenna port results in the first maximum signal headroom threshold requirement being exceeded.

10. The apparatus according to claim 9, wherein:
the second receiver chain comprises a second analog-to-digital converter having a second maximum signal headroom threshold requirement associated therewith; and
the controller is arranged to determine whether application of the receive path amplification in respect of the second receiver chain to a second signal received via the first antenna port results in the second maximum signal headroom threshold requirement being exceeded.

11. The apparatus according to claim 10, wherein the controller is arranged to program a first gain in respect of the first receiver chain and a second gain in respect of the second receiver chain in response to the first and second minimum signal headroom threshold requirements being satisfied in respect of amplification of both first and second signals received via the first and second antenna ports, respectively.

12. The apparatus according to claim 10, wherein the controller is arranged to apply a gain modification in respect of baseband processing of symbols associated with the first and second received signals.

13. The apparatus according to claim 1, wherein the signal redirection system is arranged to redirect temporarily the signal path from the second antenna port into the first receiver chain in response to an instruction to switch from using the first antenna port instead of the second antenna port in respect of uplink transmissions.

14. The apparatus according to claim 13, wherein the transmitter chain is persistently coupled to the first antenna port instead of the second antenna port in response to the instruction until a countermanding instruction is received.

15. A method of processing received signals in a transceiver apparatus comprising a transmitter chain, a first receiver chain, and a second receiver chain, the first and second receiver chains respectively comprising a first antenna port and a second antenna port at an upstream end thereof and respectively comprising a first downstream processing portion comprising a first algorithmic data processing path and a second downstream processing portion comprising a second algorithmic data processing path, and the first receiver chain and the transmitter chain sharing a duplexing component, the method comprising:
receiving an instruction to switch from using the first antenna port instead of the second antenna port in respect of uplink transmissions;
temporarily coupling the second antenna port to the first receiver chain at a point of entry thereof and in response to the received instruction, thereby redirecting temporarily a signal path from the second antenna port into the first receiver chain and then back into the second receiver chain downstream of the point of entry;
maintaining a predetermined processing relationship between the first and second downstream processing portions and the first and second antenna ports;
processing sample data in respect of the second antenna port by the second algorithmic data processing path;
storing the sample data in a memory in respect of the first algorithmic data processing path; and
modifying access to the sample data so that the sample data is processed by the second algorithmic data processing path instead of the first algorithmic data processing path.

16. A transceiver apparatus configured to support antenna selection in accordance with a communications standard, the apparatus comprising:
a hardware subsystem comprising:
a duplexing component;
a transmitter chain; and
a first receiver chain and a second receiver chain respectively comprising:
a first antenna port and a second antenna port at an upstream end thereof;
a first downstream processing portion; and
a second downstream processing portion;
wherein:
the first receiver chain and the transmitter chain share the duplexing component; and
a portion of the first receiver chain comprises receive path amplification and a portion of the second receiver chain also comprises the receive path amplification;
a signal redirection system arranged to:
in response to an antenna selection instruction, temporarily couple the second antenna port to the first receiver chain at a point of entry thereof to temporarily redirect a signal path from the second antenna port into the first receiver chain and then back into the second receiver chain downstream of the point of entry; and
maintain a predetermined processing relationship between the first and second downstream processing portions and the first and second antenna ports; and
a controller arranged to coordinate the temporary redirection of the signal path from the second antenna port into the first receiver chain;
wherein:
the first receiver chain comprises a first analog-to-digital converter having a first maximum signal headroom threshold requirement associated therewith; and
the controller is arranged to determine whether application of the receive path amplification in respect of the first receiver chain to a first signal received via the second antenna port results in the first maximum signal headroom threshold requirement being exceeded.

17. The apparatus according to claim 16, wherein:
the second receiver chain comprises a second analog-to-digital converter having a second maximum signal headroom threshold requirement associated therewith; and
the controller is arranged to determine whether application of the receive path amplification in respect of the second receiver chain to a second signal received via the first antenna port results in the second maximum signal headroom threshold requirement being exceeded.

18. The apparatus according to claim 17, wherein in response to the first and second minimum signal headroom threshold requirements being satisfied, the controller is arranged to program:
a first gain in respect of the first receiver chain, and
a second gain in respect of the second receiver chain.

19. The apparatus according to claim 17, wherein the controller is arranged to apply a gain modification in respect of baseband processing of symbols associated with the first and second received signals.

\* \* \* \* \*